United States Patent
Seshadri et al.

(10) Patent No.: US 10,332,128 B2
(45) Date of Patent: Jun. 25, 2019

(54) APPARATUS AND METHOD FOR SALES DATA GATHERING USING MOBILE PHONE

(71) Applicant: Tata Consultancy Services Limited, Mumbai (IN)

(72) Inventors: Guruprasad Seshadri, Bangalore (IN); Balamuralidhar Purushothaman, Bangalore (IN); Girish Chandra M, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 1156 days.

(21) Appl. No.: 14/419,536

(22) PCT Filed: Aug. 5, 2013

(86) PCT No.: PCT/IN2013/000480
§ 371 (c)(1),
(2) Date: Feb. 4, 2015

(87) PCT Pub. No.: WO2014/033745
PCT Pub. Date: Mar. 6, 2014

(65) Prior Publication Data
US 2015/0227948 A1    Aug. 13, 2015

(30) Foreign Application Priority Data
Aug. 24, 2012  (IN) .......................... 2467/MUM/2012

(51) Int. Cl.
*G10L 21/00* (2013.01)
*G06Q 30/02* (2012.01)
(Continued)

(52) U.S. Cl.
CPC ......... *G06Q 30/0201* (2013.01); *G06Q 30/06* (2013.01); *G10L 15/083* (2013.01); *G10L 15/22* (2013.01)

(58) Field of Classification Search
CPC ... G10L 15/083; G10L 15/22; G06Q 30/0201; G06Q 30/06
(Continued)

(56) References Cited

U.S. PATENT DOCUMENTS 5,027,406 A    6/1991   Roberts et al.
5,839,104 A   11/1998   Miller et al.
(Continued)

FOREIGN PATENT DOCUMENTS

KR    20090057178 A    6/2009

OTHER PUBLICATIONS

Iqbal, "Speech Recognition", IQRA University, Nov. 22, 2009 (37 Pages).
(Continued)

*Primary Examiner* — Thierry L Pham
(74) *Attorney, Agent, or Firm* — Finnegan, Henderson, Farabow, Garrett & Dunner LLP

(57) ABSTRACT

A method and apparatus for performing analysis on data collected at a point of sale is disclosed. The data from the point of sale is collected using voice recognition technique implemented on a mobile communication device. In order to enable this, a limited vocabulary word recognition technique is implemented using a set of libraries storing speech utterances in a memory storage unit present of the mobile communication device. Dynamic updating of module parameters associated with the stored speech utterances is enabled by a speech refinement unit of the mobile communication device. The device further enables local as well as regional data collation and analysis.

17 Claims, 5 Drawing Sheets

(51) Int. Cl.
*G06Q 30/06* (2012.01)
*G10L 15/22* (2006.01)
*G10L 15/08* (2006.01)
*G10L 25/00* (2013.01)

(58) Field of Classification Search
USPC ............... 704/231, 246, 257, 259, 270, 275
See application file for complete search history.

(56) References Cited

U.S. PATENT DOCUMENTS

| | | |
|---|---|---|
| 7,092,929 B1 | 8/2006 | Dvorak et al. |
| 7,362,236 B2 | 4/2008 | Hoiness |
| 8,078,495 B2 | 12/2011 | Zeevi et al. |
| 8,611,919 B2 | 12/2013 | Barnes, Jr. |
| 2002/0007315 A1 | 1/2002 | Rose |
| 2003/0220835 A1 | 11/2003 | Barnes, Jr. |
| 2010/0161446 A1 | 6/2010 | Alfred et al. |
| 2011/0022480 A1* | 1/2011 | Hoblit .................... G06Q 20/20 705/16 |
| 2011/0125566 A1 | 5/2011 | McLaughlin et al. |

OTHER PUBLICATIONS

Fred Demicco, "Current POS Issues", Hotel F&B, Aug. 2006 (2 Pages).

Vangard Voice Systems,"New Double-Digit Voice Productivity in a Post4G Anytime, Anywhere Enterprise Mobile World", 2010 (11 Pages).

International Search Report dated Mar. 28, 2014 in International Application No. PCT/IN2013/000480 (2 pages).

\* cited by examiner

APPARATUS AND METHOD FOR SALES DATA GATHERING USING MOBILE PHONE

CROSS-REFERENCE TO RELATED PATENT APPLICATIONS

This application is a National Stage Entry under 35 U.S.C. § 371 of International Application No. PCT/IN2013/000480, filed Aug. 5, 2013, which claims priority from Indian Patent Application No. 2467/MUM/2012, filed Aug. 24, 2012. The entire contents of the above-referenced applications are expressly incorporated herein by reference for all purposes.

FIELD OF THE INVENTION

The present invention relates to the field of data acquisition and analytics. More particularly, the invention relates to the field of sales data gathering at a plurality of service delivery point in order to derive sales data trends using a mobile communication device.

BACKGROUND OF THE INVENTION

There has been tremendous growth in retail sector due to consistent increase in the global population. Several consumer goods/commodities from different retail businesses are made available to the public by means of private retails shops, shopping-malls and government funded retail shops etc. In order to maintain the equilibrium between the demand and supply of these retail commodities, it is essential to track the sales data of these commodities sold in multiple areas by the above discussed means. Further, such tracking of sales data can help the consumer goods production businesses to monitor the purchasing behavior of the consumers to enhance their future business development plans. Thus, collection and analysis of sales data is required which can depict the sale trends for a particular period of time in a particular geographical region. The sales data collection and analysis is very critical in rural regions where demand supply lifecycle of retail commodities is very critical to targeted audience in order to survive in various climatic conditions and emergencies.

In urban areas, generally the sales data is acquired through Point-of-sale (POS) system of the retail shops or shopping malls. The POS system hosts billing machines comprising a bar-code reader and a computing system adapted to compute the total bill of the materials sold at that particular POS. Each of the articles/commodities sold through these retail shops or shopping malls is in packaged form and comprising a unique bar-code attached to it.

During billing at the POS, the bar-code attached to each article or commodity is scanned by means of the bar-code reader to retrieve the details associated with the article/commodity including the quantity of the commodity, manufacturing details and price thereof. The computing system is then adapted to cumulatively calculate the aggregated bill for the purchased commodities. Further, these details are stored in the billing machine which can be further transmitted to the consumer goods manufacturing industry for their future marketing and/or business development needs. Similarly, these details can be acquired by the government offices for their record in order to monitor demand-supply ratio of the retail commodities in a particular region. Another means to acquire sales data in urban regions is to retrieve the sales data details from credit card companies. These means of data acquisition are more prominent in developed countries wherein Retail stores and food chains are equipped with centralized systems for data acquisition and analysis. However, these methods of sales data acquisition cannot be implemented in rural regions due to several socio-economic problems and financial limitations. Therefore, monitoring of sales data in rural region is still done using traditional bookkeeping system.

In the traditional bookkeeping system, the sales data is collected from the shop owners by interviewing them personally. However, this traditional method of bookkeeping is highly unreliable and inaccurate due to lack of practicing a systematic process for keeping track of articles issued/sold to consumers. Further, the utilization of billing machines as that of urban areas cannot be implemented in the rural areas primarily due to involvement of overall infrastructure cost of billing machine and that of the bar-code reader. Also, there is constant lack of adequate supply of electricity in rural areas which may hamper the working of the billing machines due to frequent power-cutoff. Many articles in the rural shops are not sold in packaged form. Generally, the articles such as food grains are sold as per the quantity demanded by the consumer. As a result of this, the utility of bar code reader is restricted. Further, the shop owners in the rural area may not be proficient enough to operate the computing devices such as billing machines. Thus, in the present scenario, the existing systems are unable to accurately collect the details of consumption/sale of consumer goods in the rural areas, especially due to lack of a proper bookkeeping system. Consequently, this leads in inability to obtain statistics/trends related to consumption of articles/goods for a rural zone.

Hence in the light of above lacunae observed in the art, there is a long-felt need to implement an affordable and easy to use existing mobile communication apparatus for sales data gathering and analysis thereof for rural region with the assistance of a daily used communication device such as mobile phone. More particularly, there is a need for a method and apparatus that enables collecting and analysis of sales data in rural areas that helps in avoiding the problems of electricity shortage, high infrastructure cost and unreliable/inaccurate bookkeeping systems. There is a need to collect sales data from multiple retail stores in a rural region using the existing mobile communication network in order to perform sales analysis. Further, there is a need for an apparatus and method for sales data gathering using the existing communication resource such as daily used mobile phone with no additional electronics/computing hardware and thereby analysis which is minimally intrusive and highly intuitive to fluctuations in sales at retail stores in rural regions.

OBJECTS OF THE INVENTION

The primary object of a present invention is to enable a mobile communication device with data acquisition and analysis capabilities for analyzing the sales trends at a retail shop in a rural region.

Another object of the invention is to implement voice recognition capabilities in the mobile communication device in order to detect transactions being executed at the service delivery point.

Yet another object of the invention is to maintain and update a set of library storing plurality of speech samples of different voice utterances associated therewith the commodities available at the retail store.

Yet another object of the invention is to match the real-time received voice utterance with stored utterances to achieve speech recognition.

Yet another object of the invention is to cumulatively acquire sales data as a result of matching of voice utterances.

Still another object of the invention is to generate analysis reports depict the trends of sale of a particular retail commodity over a period of time on the basis of type, brand, retail shop, and season of purchase etc for transactions derived from the cumulatively acquired sales data.

SUMMARY OF THE INVENTION

Before the present systems and methods, enablement are described, it is to be understood that this application is not limited to the particular apparatus, systems, and methodologies described herein, as there can be multiple possible embodiments which are not expressly illustrated in the present disclosures. It is also to be understood that the terminology used in the description is for the purpose of describing the particular versions or embodiments only, and is not intended to limit the scope of the present application.

In one embodiment, the present invention discloses a method for cumulative data acquisition of a plurality of retail commodities sold at a service delivery point using a mobile communication device. The mobile communication device is enabled with speech recognition capabilities to detect voice data entries triggered at the service delivery point. A memory storage unit is configured to store a plurality of speech samples with different utterances associated with the retail commodities.

In one of the embodiment, a real-time audio signal at the service delivery point is captured by the mobile communication device. The display unit of the mobile communication device is used to display a group of one or more options in text-form corresponding to one or more retail commodities matching with a real-time audio signal. In order to enable this, the real-time audio signal is compared with the stored speech samples. The speech samples whose module parameters sound similar to that of the real-time audio signal are displayed on the display unit in the form of text-data.

In one of the embodiment, a speech refinement unit is provided to enhance the speech recognition capabilities of the mobile communication device. The speech refinement unit is configured to regularly update the module parameters associated with each stored speech sample. The module parameters are updated based on the appropriately selected text option displayed to the user on the mobile communication device. Further, computation of quantity of each commodity selected for each command is computed in the computing unit. The generation of sales pattern of each commodity sold is enabled and alert to the user is triggered for variation in said sales pattern, if any. The system also alerts about the stock level and other critical information associated with the goods and services. A local analysis is performed on the mobile communication device and regional analysis is performed by transmitting the acquired data to a central server. Analysis reports consolidating valuable insights associated therewith the sales pattern are generated for future reference. The analysis report also represents the variation in the sales pattern throughout a cycle.

BRIEF DESCRIPTION OF DRAWINGS

The foregoing summary, as well as the following detailed description of embodiments, is better understood when read in conjunction with the appended drawings. For the purpose of illustrating the invention, there is shown in the present document example constructions of the invention; however, the invention is not limited to the specific methods and apparatus disclosed in the document and the drawings.

DETAILED DESCRIPTION

Figure 1:
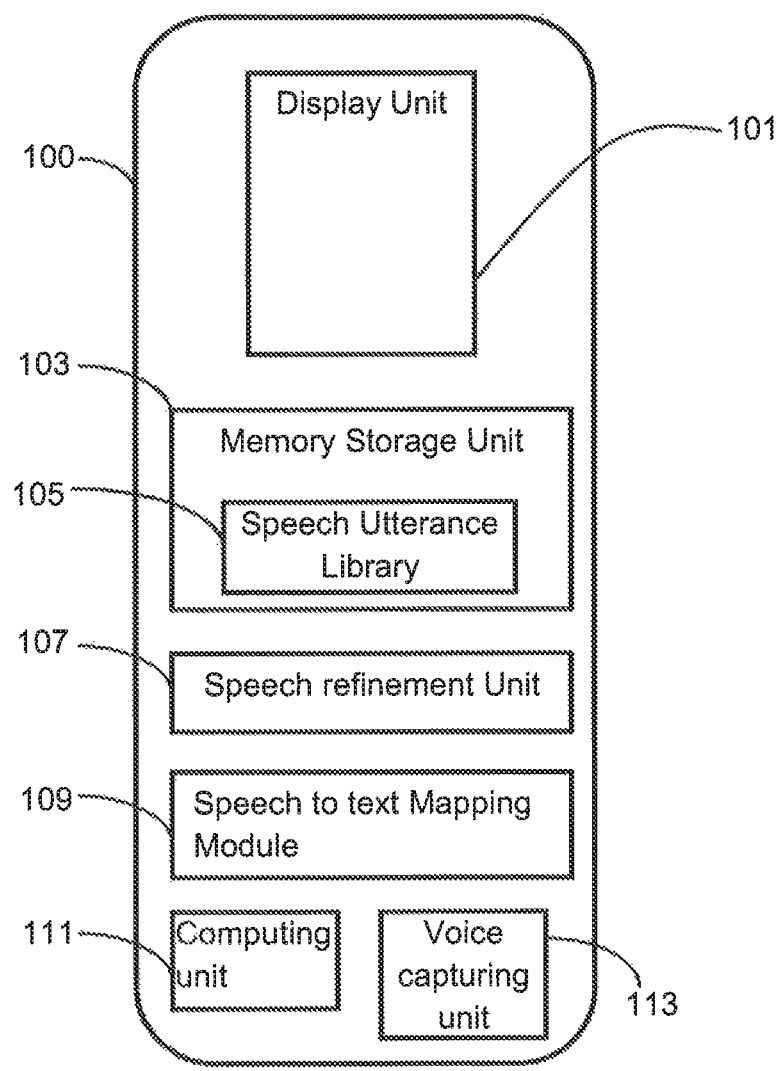
FIG. 1 is an apparatus block diagram illustrating the various modules enabled to capture speech triggered interactive data entries.

The description has been presented with reference to an exemplary embodiment of the invention. Persons skilled in the art and technology to which this invention pertains will appreciate that alterations and changes in the described method and system of operation can be practiced without meaningfully departing from the principle spirit and scope of this invention.

In accordance to one embodiment of the present invention, a method for distributed data acquisition at a plurality of nodes in a particular region is disclosed. The nodes are selected from a group consisting of service delivery places such as retail shops, hospitals, banks, government offices, shopping malls and the like. Each service delivery point is enabled with a mobile communication device such as a mobile phone, a smart-phone, a PDA, a laptop or a tablet which are minimally dependant on electricity supply and are used by people on a daily bases. These mobile communication devices are enabled with voice recognition capabilities in order to capture real-time audio signals.

In one embodiment of the present invention, a plurality of speech samples associated therewith the plurality of items or services provided at the service delivery point are stored in the form of an utterance library in a memory storage unit of the mobile communication device. The speech samples are captured from plurality of users attending the service delivery places. The speech samples creates a pool, which further enables the mobile communication device with limited vocabulary word recognition capabilities of items or services provided at the service delivery point. As a result of this the mobile communication device is able to recognize only those items and services whose speech samples are stored in the utterance library. The item details associated therewith include name of the retail commodity, quantity of the retail commodity and associated price thereof. The service details stored in the form of speech samples includes name of the service, associated charges and the like. Rest of the redundant voice detected by the mobile communication device is rejected which further enhances the performance of speech recognition.

In one embodiment of the present invention, the mobile communication device is enabled with speech capturing capabilities using audio inputting means such as microphone of the mobile communication device itself. The communication device captures current utterances produced by a user present at the service delivery point at a particular node. These current utterances are captured in real time and then compared with the stored speech samples. The speech samples whose module parameters are similar to that of the current utterance are displayed in the form of text on the display unit of the mobile communication device. The user at the service delivery point can select one of the multiple suggestive data selection options using selection means such as mouse, keyboard, touch screen and the like.

In one embodiment of the invention, based on the selection of at least one text option by the user at the service delivery point, a set of module parameters associated therewith the selected option are updated with that of the current utterance of the user. This enables the speech refining unit to the update of module parameters of the stored utterances at regular intervals. The dynamic updating of module parameters helps in enhancing the performance of voice recognition capabilities of the device.

In one embodiment of the present invention, all the identified details associated there with the selected options are transferred to the memory unit of the communication device. In this manner, all the transaction details associated therewith the items or services taking place at the service delivery center are collated to generate quantitative data. This data collected at each node is then analyzed in order to generate data analysis reports. Therefore, analysis of transactions being executed at each node is enabled. The data collected at each node is collated using a central server and wireless transmission in order to generate data analysis reports for a particular geographic region.

In one of the exemplary embodiments of the present invention, the analysis reports represent critical information of stock level at the service delivery point. The analysis reports further helps the analyst in order to understand the sales patters and accordingly take necessary steps in order to improve the quality of service. The analysis reports also help in demand supply analysis in rural region. The analysis reports depict the trends of sale of a particular retail commodity based on the type and brand preferred by most of the users, the retail shop preferred by people in the vicinity of purchase of a particular product, and season of purchase etc.

Referring to FIG. 1 is an apparatus block diagram illustrating different units and modules collectively constituting a mobile communication device apparatus (100). The mobile communication device (100) further comprises a memory storage unit (103), a speech utterance library (105); a speech refinement unit (107), a speech to text mapping module (109), a computing unit (111), a voice capturing unit (113) and a display unit (101).

In one of the exemplary embodiments of the present invention, data associated with the items available at a retail store is gathered and speech utterances of each item are captured from the plurality of users attending the retail store and stored in the form of speech samples in the memory storage unit (103). in order to achieve this, a speech utterance library (105) is maintained in the memory storage unit (103). in this exemplary embodiment, the item details associated with the items includes name of the commodity, price of the commodity and the like.

In one of the exemplary embodiments, a voice capturing unit (113) is enabled to extract current voice utterances. These current voice utterances are audio signals produced by the users during transaction executed in real-time at the retail store. In this exemplary embodiment, the strings of captured current utterances are parsed into a plurality of audio samples. Further, each of these audio samples corresponding to current utterances is then compared with the speech samples stored in the speech utterance library (105). The identified matches are then utilized by a speech to text mapping module (109) for deriving the text associated therewith the speech samples.

In one of the exemplary embodiments, if more than one speech samples are identified similar to that with the current real-time audio sample, then all the associated text with the identified speech samples is displayed on the display unit (101) of the mobile communication device (100) in the form of multiple options. The user can select the appropriate option using inputting means such as keypad, touch screen and the like present on the mobile communication device (100). The device than adapts to store these selected options in its memory storage unit (103) in the form of daily transactions. In this exemplary embodiment, these daily transactions include information such as rate of the item, quantity of the item and the like.

In an exemplary embodiment of the present invention, the speech refinement unit (107) is configured for updating the module parameters on the basis of the selection of the text option by the user, For example, the module parameters associated therewith the selected option by the user as correct utterance are updated with the module parameters such as pitch, pronunciation and the like of the corresponding audio sample using a speech refinement unit (107).

In an exemplary embodiment, all the identified transactions are collated using a computing unit (111). After collating all the transactions a quantitative data is generated associated with the identified transactions, which is then used for local analysis. In this manner, local analysis of sales data at each retail store can be performed on daily, weekly and monthly bases and analysis repots can be generated on the mobile communication device (100) using its processing power. Similarly, sales data at each retail store in a particular rural region can be gathered and transmitted using a transmission means to a central analysis server in order to perform sales data analysis of a particular region. The computing unit (111) is further configured to cumulatively acquire quantity of each commodity sold at service delivery point and accordingly generate a sales pattern thereof for each commodity. The computing unit (111) generates alert for the user based upon the variation in said sales pattern. In this exemplary embodiment, a pre-defined threshold limit is set by the device and alert is generated when a stock of the commodities reaches beyond the predefined threshold limit.

In an exemplary embodiment, the central server comprises a data analytics module that performs real-time data analytics on the received sales data from different retail stores to generate analysis reports for collated sales data analytics of a particular region containing multiple retail stores.

Figure 2:
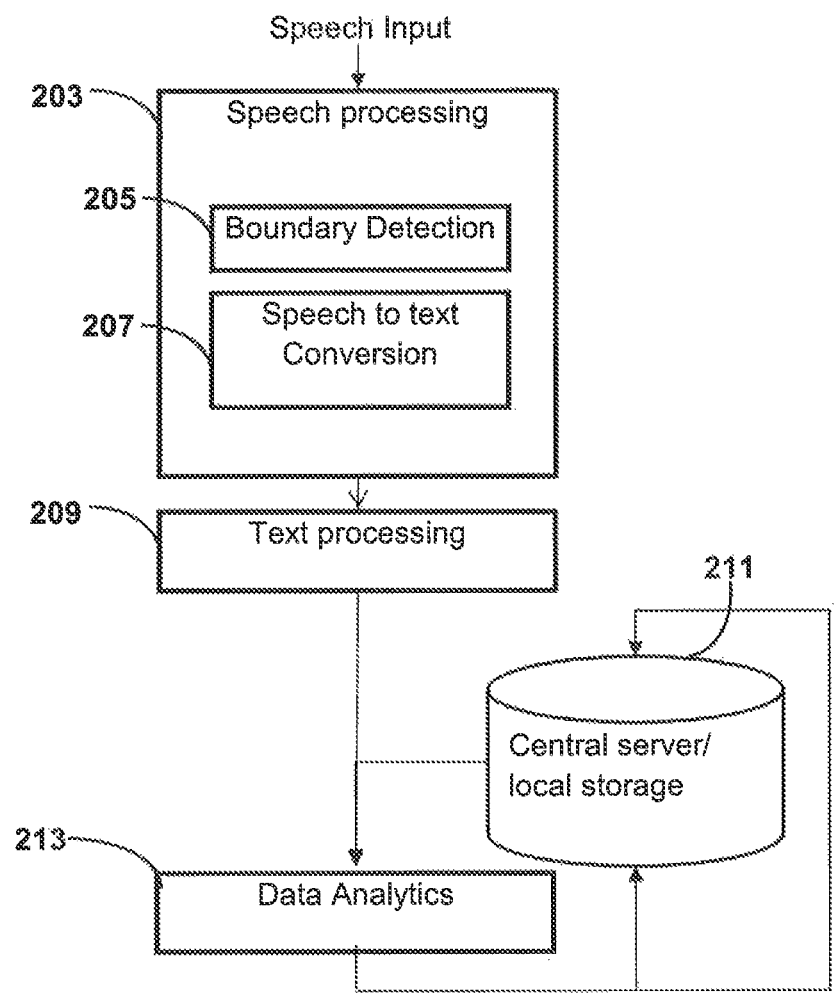
FIG. 2 is a flow diagram illustrating different blocks of the mobile communication device involved in the process of sales data gathering using mobile communication device.

Referring to FIG. 2 is a flow diagram illustrating different blocks involved in the process of sales data gathering using mobile communication device, The process of sales data gathering is divided into three blocks namely speech processing Block (203), Text Processing Block (209) and data analytics (213). Speech utterances from different users attending the service delivery point are captured by the speech processing block (203). This sequence is broken down into sequence of words by the speech processing module (203). The process of conversion of speech utterances into sequence of words involves two steps: boundary detection (205) and Speech to text conversion (207). In the boundary detection step (205), a sequence of phrases signifying a particular item is generated using touch screen or keypad inputs. The speech signal corresponding to the details of one item is further processed by detecting the word boundaries and then recognizing the words in each phrase. The parsed speech utterances are then inputted to the speech to text conversion step (207) which generates a sequence of recognized words, The speech to text conversion step (207) is elaborated in detail in FIG. 3.

In one of the exemplary embodiments of the present invention, the output of the speech processing module in the form of sequence of words is inputted to the text processing block (209). The text processing block (209) converts the received sequence of words in to a text form representing list of items involved in the transaction and their associated prices. The text processing block (209) then parses the text and organizes the details corresponding to each article. These details include the name, quantity and price of the article. The date and time of the transaction are tagged on to these details, so as to help obtain a consolidated list of articles sold on a specific day. This list of items is collated in central server or a local storage (211) of the mobile communication device. In this manner all the transactions being executed are gathered periodically either on the local storage or the central server (211).

In one of the exemplary embodiments of the present invention, the stored data in the local storage is analyzed by the data analytics block (213). The data analytics block (213) is adapted to generate analysis reports illustrating statistical analysis data of sales pattern for a particular service delivery point. Alternately sales data from various retail stores can be collated at a single central server in order to generate sales patters in a particular region. The analytics subsystem helps in extracting information over a specific period of time such as a week, month or a year. The statistical analysis data illustrates trends depicting sale of an article based on the type and brand, the shop within a given region and the time/season of the year for purchase of that particular brand.

Figure 3:
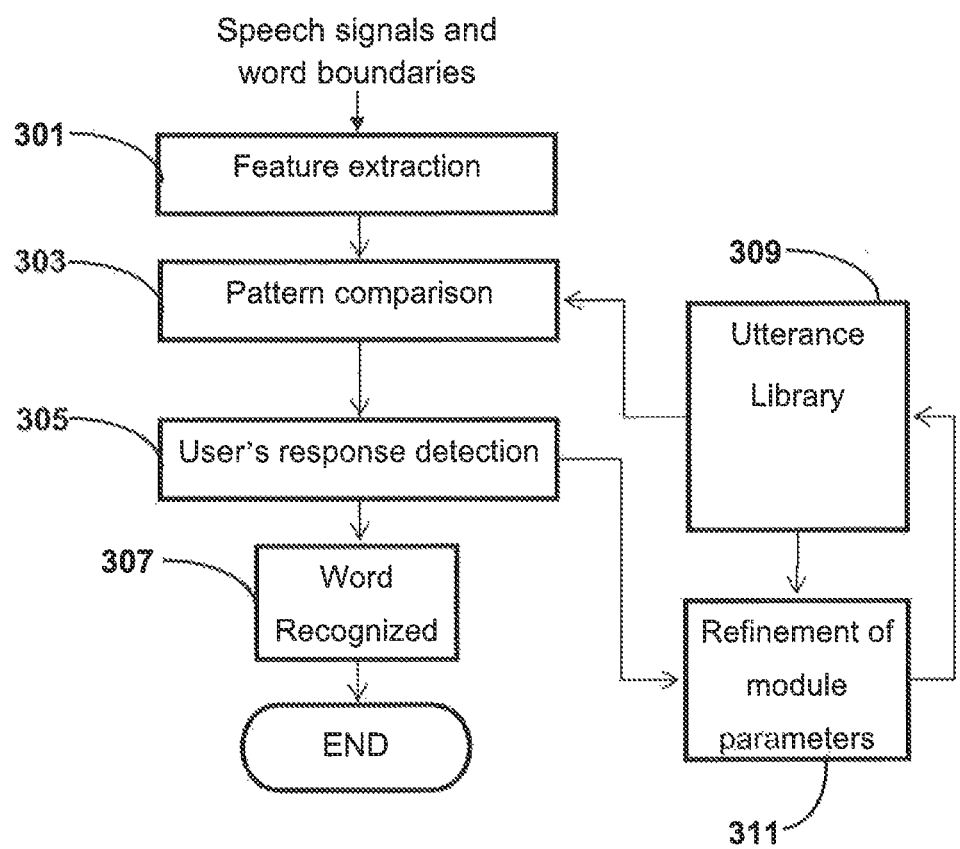
FIG. 3 illustrates the speech to text conversion process and refinement of module parameter associated therewith the speech samples during the process of speech to text conversion.

FIG. 3 illustrates the speech to text conversion process and refinement of module parameter during the process of speech to text conversion. The process of speech to text conversion starts with a feature extraction step (301). In this step, speech signals and word boundaries received from the boundary detection step are processed in order to extract the features of the speech signal. Based on the extraction a feature, vectors are generated. The feature extraction step (301) is then followed by the pattern comparison step (303). In the pattern comparison step, the feature vector of the speech utterances is compared with the feature vectors of the stored speech samples in an utterance library (309) and word model which determines the least distance between the features vector is hypothesized in the form of spoken word. A list of few candidate words to improve the accuracy of recognition is generated.

In one exemplary embodiment of the present invention, the pattern comparison step (303) is then followed by the user's response detection step (305). In this step, the list of few candidate words is displayed on the display unit of the mobile communication device. The user can select the appropriate match from the displayed list using known techniques such as touch input, keyboard, keypad and the like at the word recognition step (307). At step (311) refinement of the module parameters takes place based on the user selected text option. In this exemplary embodiment, the user's response is utilized to refine the parameters of the model of the corresponding word selected by the user. Over a period of time, the word models are adapted to the speech of a given user, due to regular updating of module parameters. The speech utterances stored in the library are updated by the refinement module.

Figure 4:
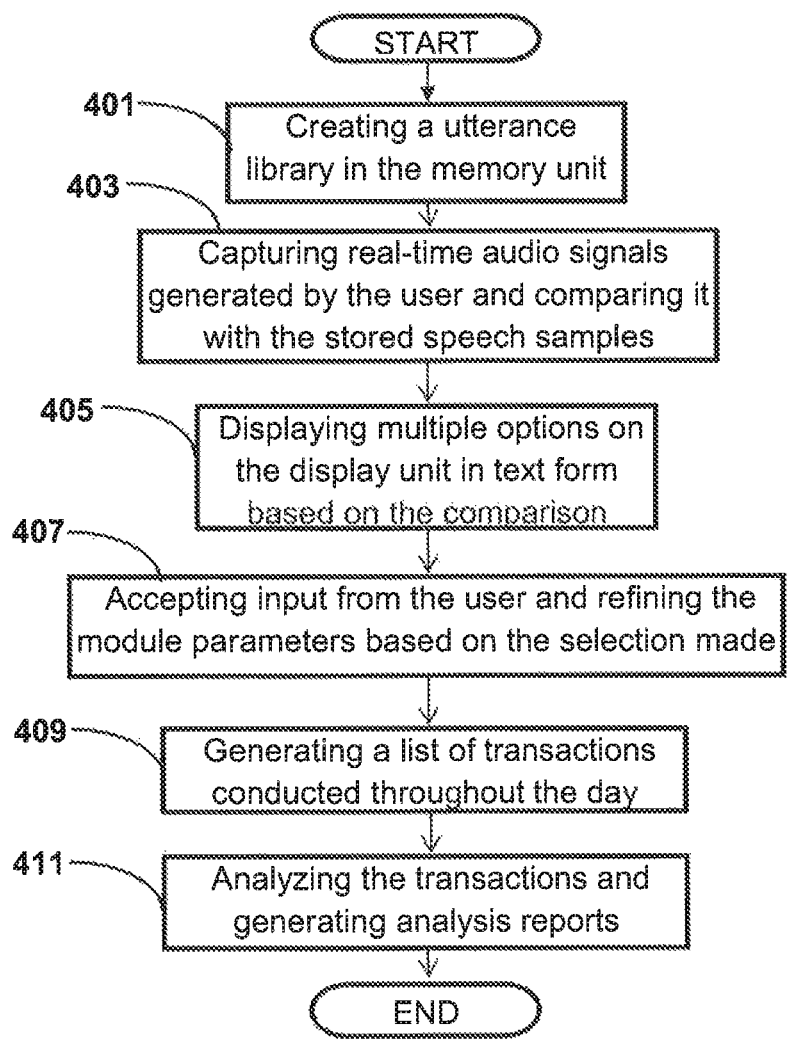
FIG. 4 illustrates a flowchart representing the sequential steps executed in order to gather sales data from the service delivery point.

FIG. 4 illustrates a flow diagram depicting the processor implemented steps in order to gather sales data from a service delivery point at a retail store using a mobile communication device. At step (401) speech samples of goods and services available at the service delivery place are captured from a plurality of users attending the service delivery point of a retail store and are stored in the utterance library. This utterance library is stored in the memory unit of the mobile communication device and updated at regular intervals with new launches and arrivals. At step (403) real-time speech signals generated by the users attending the service delivery point are captured by the mobile communication device and compared with the speech samples stored in the utterance library. The processing unit shortlists the relevant speech samples based on the comparison and display the shortlisted samples in the form of text on the display unit of the mobile communication device at step (405). The user can then select the appropriate options using inputting means such as keypad, touch screen input, keyboard and the like. At step (407), based on the selection made by the user a refine of the speech sample associated therewith the selected option by updating the module parameters associated therewith the speech sample with that of the real-time speech signals in order to refine the quality of speech recognition.

In another exemplary embodiment, a continuous stream of real-time audio signals is captured and a list of transaction taking place at the service delivery place is generated at step (409). These transactions are collated and analysis reports associated therewith the transactions is generated at each service delivery place at step (411). These analysis reports represent the sales pattern that for market analysis. Alternately transaction data from a plurality of retail stores in a particular region can be gathered and an overall regional analysis can be performed

WORKING EXAMPLE

Figure 5:
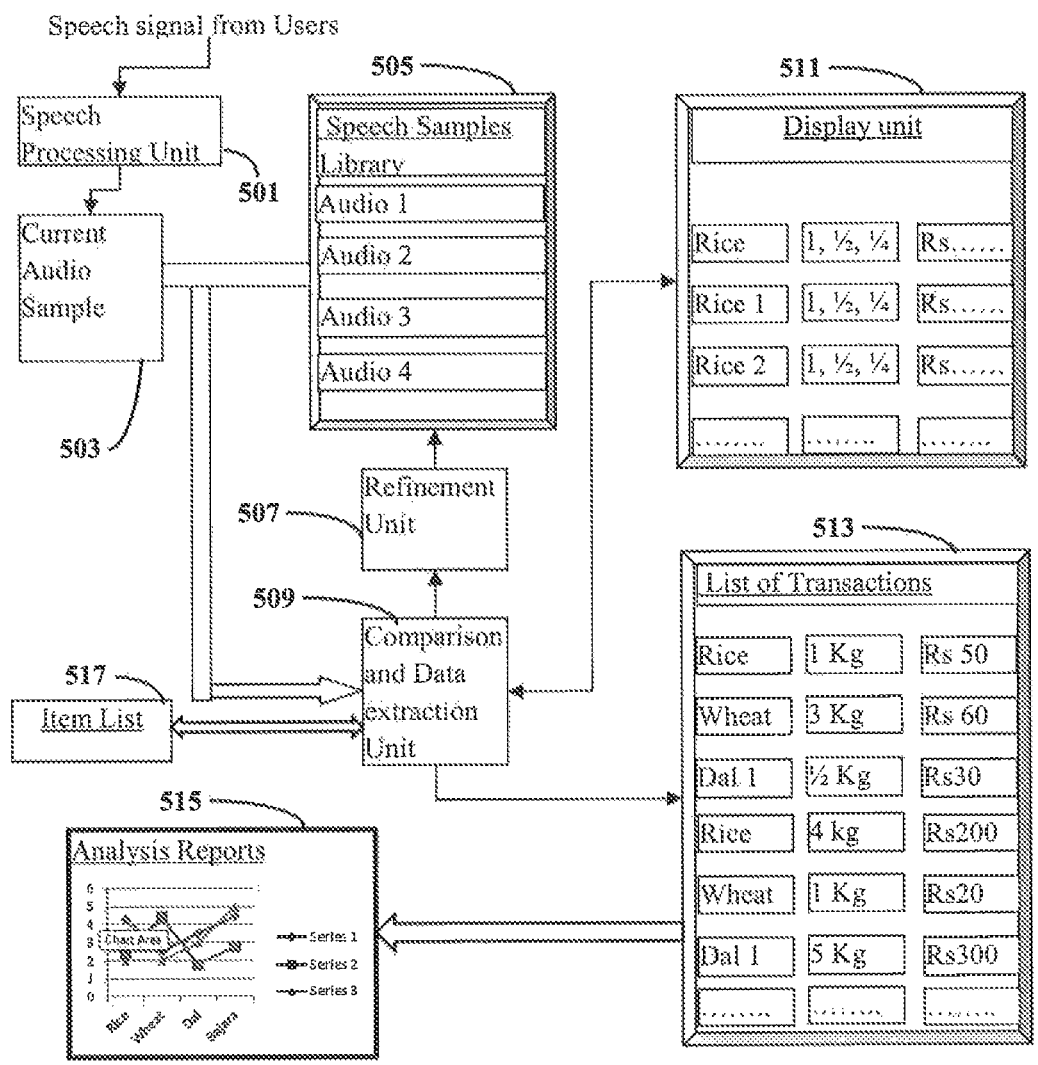
FIG. 5 illustrates the working of the mobile phone in order to acquire sales data at a service delivery point.

FIG. 5 illustrates the working of the mobile phone for gathering sales data at a retail shop in a rural region in accordance with an exemplary embodiment. In this embodiment, speech signals from shopkeeper at the service delivery point of the retail shop are captured and transmitted to the speech processing unit (501) of the mobile phone. These speech signals contain name of the items, quantity of purchase, and associated price etc. for each item being sold through the retail shop. These speech signals received from the shopkeeper are parsed into a plurality of current audio sample (503) by the speech processing unit (501). Each current audio sample (503) indicates an individual. item purchased by the customer. A Speech samples Library (505) is maintained in the memory storage unit storing plurality of speech samples representing details associated therewith each item available at the retail store. For example, the stored plurality of speech samples can be related to details of retail items such as type of item (Rice, Sugar, and Wheat etc), quantity of items (1 Kg, ½ Kg, and 5 Kg etc) and price of the items. The comparison between the current audio sample (503) and the stored speech samples (505) takes place at the comparison and data extraction unit (509).

In an exemplary embodiment, during real-time purchase request received from the customer, the shopkeeper utters the name of the corresponding item purchased by the customer in the mobile phone. For example, if the item purchased by the customer is rice, the shopkeeper transmits the voice utterance as "Rice 1 KG" in the mobile phone. As-soon-as the voice utterance is received; all possible combinations of the variety of rice available at the store are displayed on the display screen of the mobile phone. These combinations are displayed as a result of comparison of the module parameters of current audio sample (503) with the module parameters of all the audio samples in the speech samples library (505). Based on the comparison, a plurality of types of rice and their associated price is retrieved from the item list (517) and is displayed on the display unit (511) of the mobile phone in the form of textual data.

In this exemplary embodiment, the shopkeeper can provide input in the form of touch screen or keypad in order to select the appropriate option from the displayed items. The refinement unit (507) updates the module parameters of the speech sample associated with the selected option with the module parameters of current audio sample (503). In a similar manner, the request for multiple retail goods can be accepted and transacted in a single transaction for the same customer. Finally, at the end of transaction of that particular customer and accepting all the items, the computing unit of the mobile phone is adapted to generate an automatic bill summing up the entire transaction for that particular customer. The generated bill is then displayed to the shopkeeper on the mobile screen and simultaneously stored in the memory of the mobile phone. Likewise, similar process of receiving request for purchase of retail items, comparison of current audio samples of the shopkeeper to those with the stored samples library and computing the aggregated bill of the transaction conducted with other customers in the same retail shop takes place. Further the mobile displays the list of transactions (513) summarizing the transactions taking place at the retail shop.

In an exemplary embodiment, these transaction details captured and stored in the mobile phone then can be used for sales data analytics by a retail-analytics agency for tracking the sales of various items in the rural region. For example, a retail analyst representing the retail-analytics agency can request for the transaction details stored in the shopkeeper's mobile phone in order to derive sales data analysis to track the sale of particular items in that particular rural region. Alternatively, the retail-analyst can receive transaction details stored on the analytics server of the retail-analytics agency uploaded by the shopkeeper for performing the analysis. The sale data analytics may be in the form of analysis reports (515) generating insightful charts depicting the sale trends of a particular item on the basis of retail brand, retail type, retail shop, and season of purchase etc. Further, the charts can be generated may depict the performance of sales of the retail commodities on weekly, monthly, quarterly and annual basis.

In an exemplary embodiment, the apparatus and method of the invention enables the sales data gathering and analysis thereof using the mobile phone used by the shopkeeper without any additional hardware requirement. There is no need of installing any electricity controlled equipments for tracking the sale purchase. Further, the retail sale analytics can be implemented with no or intermittent network connectivity, thus avoiding the limitations of continuous electricity supply and internet connections in the rural regions. Thus, the proposed apparatus is low-cost, hardware independent, feasible, easy to handle and hence can he beneficial to both the retail seller and retail analytics communities.

The methodology and techniques described with respect to the exemplary embodiments can be performed using a machine or other computing device within which a set of instructions, when executed, may cause the machine to perform any one or more of the methodologies discussed above. The machine may comprise a mobile phone, a tablet PC, a laptop computer, a smart-phone, a PDA or any mobile machine capable of executing a set of instructions (sequential or otherwise) that specify actions to he taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing module), a memory which communicates with each other via a bus. The memory stores the instructions when executed, may cause the processor of the machine to instruct one or more modules illustrated in FIG. 1 to perform any one or more of the methodologies discussed above.

ADVANTAGES OF THE INVENTION

The present invention has following advantages:

The present invention enables collection of data from service delivery places present at the retail stores using speech recognition technique implemented on a mobile communication device.

The present invention further enables speech refinement of stores speech samples for better identification of audio data.

The present invention further enables analysis local as well as regional analysis of data in a particular region.

The present invention further enables data gathering and analysis in a cost effective manner using a mobile communication device

We claim:

1. An apparatus for executing a plurality of voice triggered commands for cumulative data acquisition of a plurality of retail commodities, the apparatus comprising:
   a memory storage unit to store a plurality of speech samples including utterances associated with item details pertaining to a plurality of retail commodities;
   a user interface unit to display one or more suggestive data selection options in text-form corresponding to one or more retail commodities matching a received real-time audio signal when model parameters of the stored plurality of speech samples are similar to model parameters of the received real-time audio signal;
   a speech refining unit to enhance speech recognition capabilities of the apparatus by dynamically updating the model parameters associated with at least one stored speech sample based on a selection made from the plurality of suggestive data selection options in the text-form; and
   a computing unit configured to cumulatively acquire sales data, including a quantity of each commodity selected for each displayed option.

2. The apparatus of claim 1, wherein said apparatus is selected from a group of communication devices including a mobile phone, a smart-phone, a PDA, a laptop and a tablet.

3. The apparatus of claim 1, wherein said item details include at least one of a name of a retail commodity, a quantity of a retail commodity or the price of a retail commodity.

4. The apparatus of claim 1, wherein said apparatus further comprises a speech-to-text mapping module configured to derive text associated with speech samples corresponding to the real-time audio signal.

5. The apparatus of claim 1, wherein said computing unit is further configured to generate analytic reports depicting sales trends for a particular retail commodity based on the type of brand, shop of purchase, and a season of purchase.

6. The apparatus of claim 1, wherein said plurality of speech samples are captured from plurality of users selling retail commodities in a retail shop.

7. The apparatus of claim 1, wherein:
the sales data further includes price, quantity, and rate; and
the computing unit is further configured to generate a local analysis report which is transmitted to a central server for regional analysis.

8. The apparatus of claim 1, wherein the computing unit is further configured to:
analyze the sales data; and
generate sales patterns for each commodity sold at the retail store.

9. A method for executing a plurality of voice triggered commands for cumulative data acquisition of a plurality of retail commodities, said method comprising processor implemented steps of:
storing a plurality of speech samples including utterances associated with item details pertaining to a plurality of retail commodities;
dynamically displaying of one or more suggestive data selection options in text-form corresponding to each retail commodity matching a received real-time audio signal when model parameters of the stored plurality of speech samples are similar to model parameters of the received real-time audio signal;
enhancing speech recognition capabilities by dynamically updating the model parameters associated with at least one stored speech sample based on a selection made from the plurality of suggestive data selection options in the text-form; and
acquiring sales data, including a quantity of each commodity selected for each displayed option.

10. The method of claim 9, wherein said plurality of speech samples are captured from plurality of users selling retail commodities in a particular region.

11. The method of claim 9, wherein said item details include at least one of a name of a retail commodity, a quantity of a retail commodity, or a price of a retail commodity.

12. The method of claim 9, wherein said real-time audio signal is received from a user when a request for new purchase of a commodity is issued.

13. The method of claim 9, further comprising analyzing said speech samples to extract model parameters corresponding to each word in the speech samples.

14. The method of claim 13, wherein said options displayed in text-form to speech samples whose model parameters match the real-time audio signal.

15. The method of claim 9, wherein enhancing speech recognition capabilities includes improving the ability to identify text corresponding to received real-time audio signals.

16. The method of claim 9, wherein:
the sales data further includes price, quantity, and rate; and
the method further comprises generating a local analysis report which is transmitted to a central server for regional analysis.

17. The method of claim 9, further comprising:
analyzing the sales data to generate a sales pattern of each commodity sold at a retail store.

* * * * *